US006356174B1

(12) United States Patent
Hannula

(10) Patent No.: US 6,356,174 B1
(45) Date of Patent: Mar. 12, 2002

(54) OPERATOR FOR AN ELECTROMAGNETIC SWITCHING DEVICE

(75) Inventor: Raymond H. Hannula, Watertown, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 09/816,181

(22) Filed: Mar. 23, 2001

Related U.S. Application Data

(62) Division of application No. 09/255,759, filed on Feb. 23, 1999, now Pat. No. 6,229,417.

(51) Int. Cl.[7] ........ H01M 51/22
(52) U.S. Cl. ........ 335/80; 335/124
(58) Field of Search ........ 335/78–86, 124, 335/128, 131–2, 185–195, 251

(56) References Cited

U.S. PATENT DOCUMENTS 3,659,237 A * 4/1972 Wilsdon et al. ............ 335/128
6,229,417 B1 * 5/2001 Hannula .................... 335/132

* cited by examiner

*Primary Examiner*—Lincoln Donovan
(74) *Attorney, Agent, or Firm*—Patrick S. Yoder; Alexander M. Gerasimow; William R. Walbrun

(57) ABSTRACT

An operator assembly for an electromagnetic switching device includes a pair of insulative boards arranged in mutually facing relation. A first board carries first contacts, which may be arranged in pairs, while a second board carries second contacts designed to engage the first contacts upon closure. The first and second boards are pivotally secured to one another to rock between open and closed positions. A biasing member urges the board towards a normal position. The first board supports an electromagnet assembly and conductive traces for transmitting energizing current to the electromagnet coil. The second board supports an armature which is displaced under the influence of the electromagnet assembly during energization, thereby pivoting the boards with respect to one another against the force of the biasing member, and moving the first and second contacts into engagement.

25 Claims, 5 Drawing Sheets

OPERATOR FOR AN ELECTROMAGNETIC SWITCHING DEVICE

This application is a Divisional of application Ser. No. 09/255,759 filed Feb. 23, 1999 now U.S. Pat. No. 6,229,417.

BACKGROUND OF THE INVENTION

1. Field of the Invention

The present invention relates generally to the field of electromagnetic devices for completing and interrupting current carrying paths between a source of electrical power and a load. More particularly, the invention relates to a novel technique for forming an electromagnetic operator which serves to complete and interrupt the current carrying paths in such devices upon the application or removal of control signals.

2. Description of the Related Art

A wide variety of electromagnetic devices have been devised for completing and interrupting current carrying paths between electrical sources and loads. In several families of such devices an electromagnet is formed by winding a conductive wire around a core. A field is generated by the electromagnet upon application of a current through the winding. The field is used to attract an armature which, in turn, causes displacement of movable contacts within the device. Depending upon whether the device is coupled in a normally open or normally closed orientation, the control signals may thereby complete a current carrying path through the device, or interrupt the path. Upon removal of the control signal from the actuator coil, biasing members such as compression springs are often employed to return the armature and movable contacts to their normal or biased position.

While devices of the type described above are generally suitable for many applications, they often include a large number of individual parts which must be separately designed, manufactured and assembled. For example, in a conventional contactor, an operator assembly, including the electromagnet coil is assembled around the coil or the coil bobbin in one portion of the contactor, while stationary and movable contacts are assembled in another portion of the device. Even in relatively small, single-phase devices, the resulting number of individual parts is fairly large. In larger, multi-phase devices, the number and size of the individual components is substantially increased, although certain components may be shared between power phase sections. As the number and complexity of the individual components of these devices increases, so does the cost both in terms of design, manufacturing, tooling, and assembly. Moreover, an increased complexity of the device sometimes gives rise to an increased risk of failure of individual components or subsystems which can reduce the useful life of the entire device package.

There is a continuing need, therefore, for an improved operator structure that can be used in electromagnetically-operated devices, such as contactors, circuit interrupters, switch gear, motor starters, and so forth. There is a particular need for relatively simple structures which can be manufactured of readily available materials and which is extremely robust. Such improved structures are advantageously actuated and returned to a normal position by means which do not require excessive power input as control signals.

SUMMARY OF THE INVENTION

The present invention provides a novel technique for forming an electromagnetic operator designed to respond to these needs. The structure incorporates an electromagnet assembly which is operative to draw an armature by virtue of an electromagnetic field created upon the application of control signals. The electromagnetic coil assembly is positioned in a plate-like structure, as is the armature. The plates are positioned in a mutually facing relation and the armature is held in a space relation with respect to the coil assembly by a lever-type pivot arrangement. In a preferred configuration, the pivot arrangement forms a fulcrum between the plate structures, and a generally C-shaped biasing spring urges the two plates away from each other in the normal condition. Upon energization of the coil assembly, the biasing force is overcome and the plates approach one another under the influence of the attraction of the armature in the resulting magnetic field. One or both of the plates may carry one or more contact members. In a presently preferred configuration, several such contact members are carried by one of the plates and complete contact when the two plates are moved toward one another. The plates may be made of a very robust, readily available material such as multi-layer laminate comprising a fiberglass and epoxy structure, such as materials used for the fabrication of circuit boards. The subassemblies of the operator are preformed and may be simply and easily mounted to one another in efficient assembly steps.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
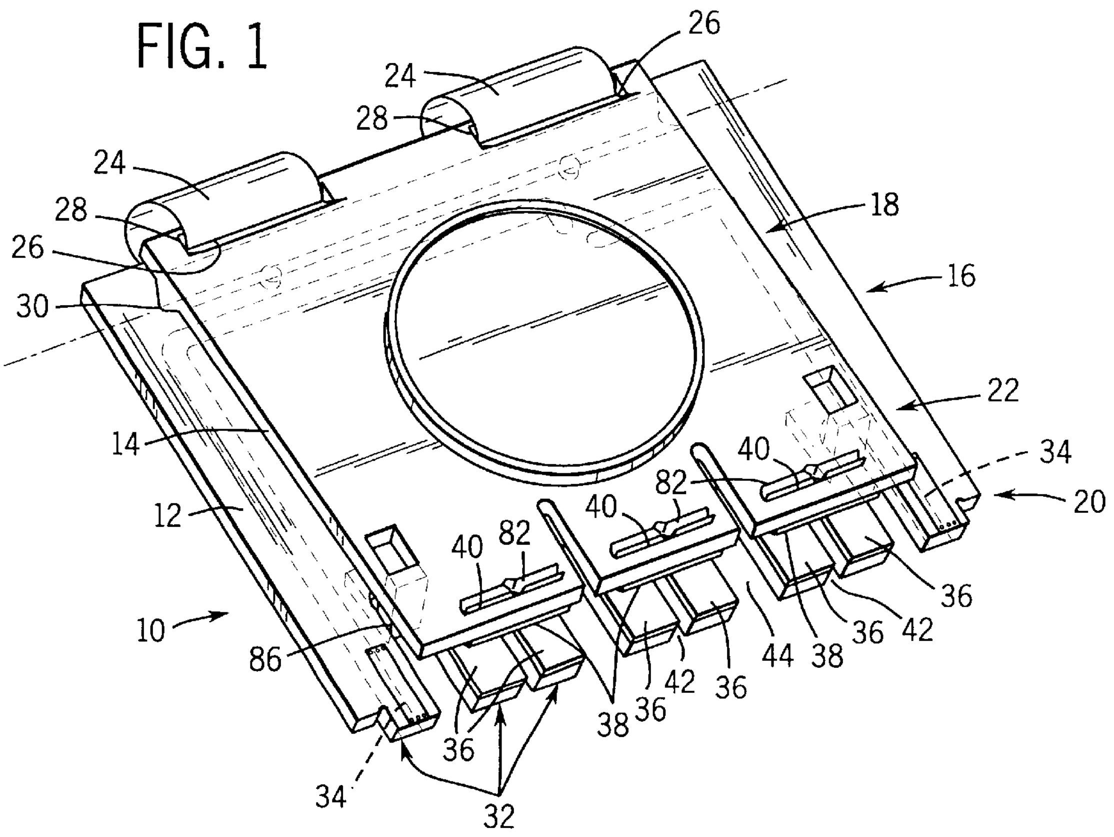
FIG. 1 is a bottom perspective view of an operator assembly for completing contact between conductive elements in accordance with the present technique.

Turning now to the drawings, and referring first to FIG. 1, an operator assembly for completing contacts between electrically conductive elements is illustrated and designated generally by the reference numeral 10. The assembly includes a pair of boards or plates positioned in mutually-facing relation and each carrying cooperating conductive elements as well as components for selectively bringing the elements into contact with one another, and separating the elements. In the illustrated embodiment, a first stationary contact plate 12 is thus positioned adjacent to a second or movable contact plate 14. Contact plate 12 carries an electromagnet assembly as described below, while movable contact plate 14 carries an armature assembly which is attracted to the electromagnet during operation. Electrical contacts are carried by both plates which are brought into engagement with one another to complete electrical current carrying paths upon actuation of the assembly, and which are separated from one another upon removal of actuating current. As illustrated in the Figures, stationary contact plate 12 thus includes an actuator portion 16, while movable contact plate 14 includes a corresponding, mutually-facing actuator portion 18. Stationary contact plate 12 further includes a contact portion 20 facing a corresponding contact portion 22 of movable contact plate 14.

Adjacent to edges of the contact plates opposite from the contact portions, a pair of return springs 24 urge the contact plates to a normal or biased position. As described more fully below, each of the springs may be conveniently formed of resilient metal, such as spring steel. Each spring includes a pair of bearing or compression ridges 26 (one such bearing shown for each spring in FIG. 1) for contacting both the stationary and movable contact plates. Each contact plate includes a pair of recesses 28 for receiving the bearing portions of the springs. Offset from the recesses 28, and on an opposite side of movable contact plate 14, plate 14 features an elongated rocker or protrusion 30 designed to bear against the face of stationary contact plate 12. As described more fully below, the stationary and movable contact plates, in cooperation with biasing springs 24 and protrusion 30, form a simple lever system in which the movable contact plate 14 rocks under the influence of the biasing springs and force is exerted by the electromagnet assembly and armature to separate the conductive elements from one another, and to bring the elements into contact with one another as desired.

In the illustrated embodiment, the contact portions 20 and 22 of the stationary and movable plates include a series of prongs 32 formed integrally with the body of the respective plate. The prongs of the stationary contact plate 12 carry electrical connections between the assembly and external circuitry (not shown). The prongs of the stationary contact plate 14 carry movable contacts for completing current carrying paths. Thus, outer most prongs on the stationary contact plate 12 carry actuator leads or traces 34 on a rear side of the stationary contact plate. Leads 34 permit the contact plate to be inserted into or otherwise coupled with switching circuitry for applying actuating current to the assembly. Between the actuator leads, other prongs on stationary contact plate 12 carry stationary contacts 36. In the illustrated embodiment, the stationary contacts are disposed in pairs corresponding to line and load sides of respective current-carrying paths. Three such pairs permits the operator assembly to be integrated into a three-phase contact module. Adjacent to each pair of stationary contacts 36, movable contact plate 14 carries movable contacts 38. Each movable contact is secured in a recess 40 formed through the movable contact plate 14. When actuating current is applied to the assembly, as described below, movable contact plate 14 rocks about a fulcrum point established by protrusion 30, against the force of biasing springs 24, to span between the pairs of stationary contacts. Accordingly, each pair of stationary contacts is separated by a slot or space 42, spanned by the movable contacts in operation. Moreover, where a series of stationary contact pairs are provided, additional slots or spaces 44 are provided between each pair, corresponding to spacing between separate electrical phases in a final assembly.

It should be noted, that while the embodiment of the operator assembly described herein is a three-phase device, similar structures may be adapted from these teachings to accommodate single-phase devices. In single-phase devices, a single pair of stationary contacts may be provided with a single movable contact or spanner designed to close a circuit between them. It should also be noted that while in the present discussion one of the contact plates is stationary while the other is movable, and the movable contact plate carries a rocker or a fulcrum protrusion, the present teachings may be adapted to various alternative structures. For example, both of the plates may be configured to move with respect to one another, and a stationary plate, or both plates, may be provided with rockers or functionally similar structures. Furthermore, while in the preferred embodiment, stationary contacts are provided on the stationary contact plate, with movable contacts spanning these stationary contacts in pairs, alternative structures may include mutually facing plates on which a single stationary contact and a single movable contact are brought into engagement with one another during actuation, or in which a pair of contacts in mutually-facing relation are both movable.

Figure 2:
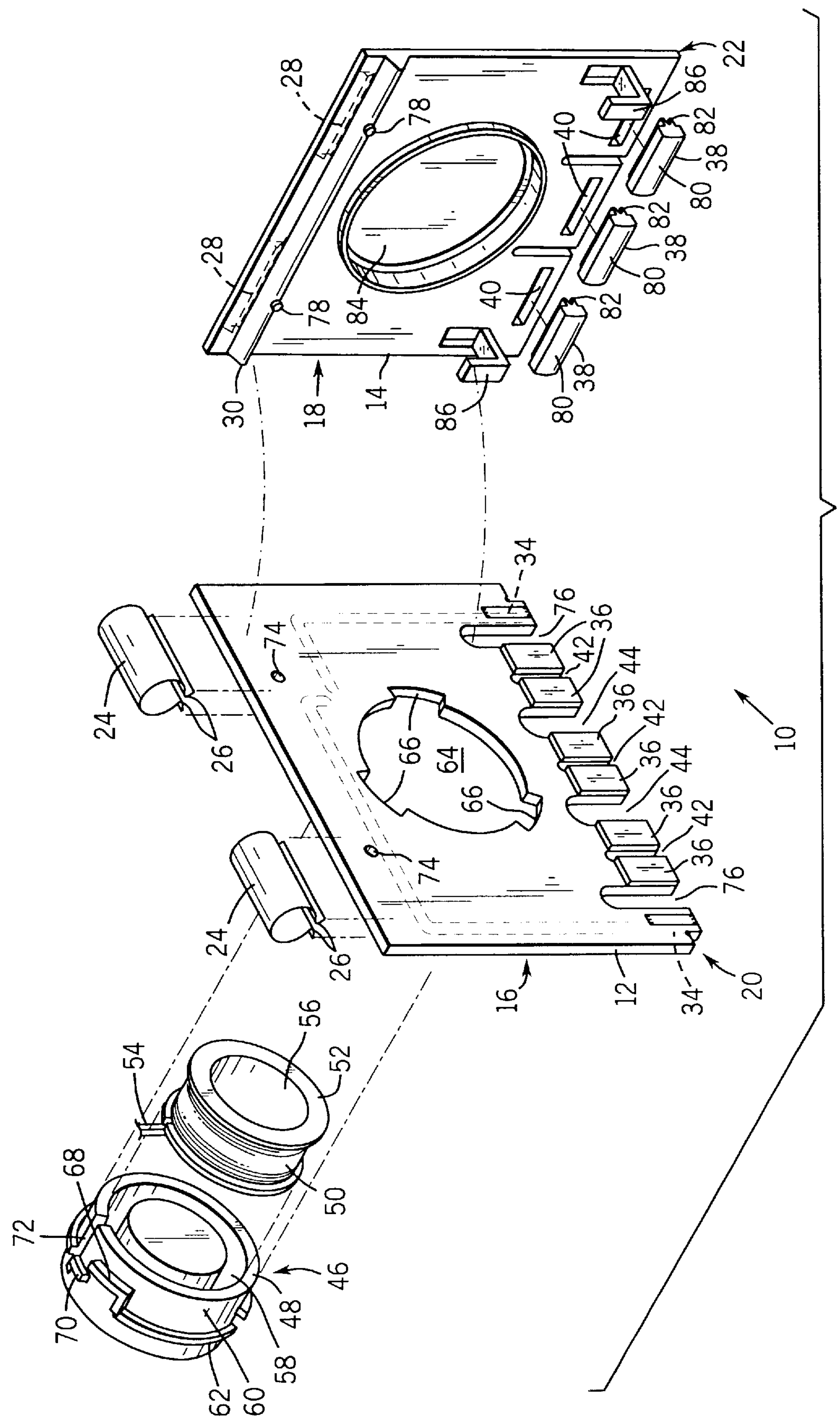
FIG. 2 is a perspective exploded view of the assembly of FIG. 1, illustrating its component parts.

FIG. 2 illustrates the components of assembly 10 in an exploded view. As shown in FIG. 2, stationary and movable plates 12 and 14 are conveniently formed as separate structures and assembled with their separate components prior to final assembly of the operator by mating the plates and placing the biasing springs in their proper positions. Each plate is constructed of an insulative material, such as fiberglass and epoxy laminate, or molded plastic, and is machined or stamped to provide the support structures shown. Certain of the electrical connections made to one or both plates may be formed in conventional circuit board manufacturing operations, including the formation of actuator leads 34 on stationary contact plate 12. Subsequently, stationary contacts 36 are secured to the face of stationary contact plate 12 by conventional bonding techniques. Each plate may be made of any suitable material, such as silver electroplated copper. Movable contacts 38 may be made of similar materials.

As shown in FIG. 2, stationary contact plate 12 carries an electromagnet assembly 46 which may be energized to produce an electromagnetic field for closing the operator assembly (i.e. drawing the movable contact plate toward the stationary contact plate). Electromagnet assembly 46, in turn, includes a support structure or yoke 48 and an electromagnet winding 50 wound on an insulative bobbin 52. Leads 54 extend from the winding for electrical connection to a source of actuating current. Bobbin 52 surrounds a central aperture 56 to form an annular structure which is designed to fit within a corresponding annular recess formed in yoke 48. Yoke 48 includes a side wall 60 surrounding the annular recess on which a series of securement ribs 62 are formed. Ribs 62 are designed to interface with portions of stationary contact plate 12 to facilitate assembly of the electromagnet assembly within the plate and to hold the electromagnet assembly firmly in place during operation. To accommodate the securement ribs, plate 12 includes a central aperture 64 which is generally circular in shape but which includes a series of radial recesses 66. Securement ribs 62 of yoke 48 include ribs which engage front and rear sides of stationary contact plate 12 and which cooperate with portions of the plate bounding aperture 64 to maintain the electromagnet assembly in place. Specifically, in the illustrated embodiment, front-fitting abutment ribs 68 extend partially around yoke 48, while rear-fitting ribs 70 extend around the remainder of the yoke between the front-fitting ribs.

The electromagnet assembly 46 may be preassembled and later inserted into the stationary contact plate as follows. With the winding 50 wound about the bobbin, the bobbin is slipped into the annular recess 58 of yoke 48 and held in place by an adhesive or epoxy. It should be noted that yoke 48 includes a lateral groove 72 along its length to accommodate leads 54 extending from the winding. The yoke is then inserted through stationary contact plate 12 with front-fitting ribs 68 passing through radial recesses 66. The yoke is then turned slightly (clockwise in the orientation shown in FIG. 2) to lock a portion of the stationary contact plate in a region between the front-fitting and rear-fitting ribs of the yoke.

In addition to the aperture for supporting the electromagnet assembly, stationary contact plate 12 includes alignment holes or recesses 74 for preventing movement of the movable contact plate with respect to the stationary contact plate when the assembly is brought together. Moreover, lateral slots 76 are formed between the pairs of stationary contacts and the prongs on which the actuator leads 34 are formed. As described below, slots 76 receive abutments or stop members for limiting movement of the movable contact plate in its biased position.

Referring still to FIG. 2, movable contact plate 14 presents a pair of alignment pins 78 extending from protrusion 30. Alignment pins 78 fit loosely within alignment holes 74 of the stationary contact plate to prevent lateral sliding of the plates with respect to one another, while nevertheless permitting rocking movement of the movable contact plate on the stationary contact plate. On the edge opposite from protrusion 30, movable contact plate 14 includes a series of apertures 40 for receiving the movable contacts 38. Each movable contact includes a contact surface 80, as well as a securement extension 82 which extends through the apertures 40 on mounting. Securement extensions 82 may be configured to be staked in place to prevent removal of the movable contacts from the movable contact plate after insertion and assembly. In a central region of the movable contact plate, armature 84 is mounted and securely held in place. Armature 84 may be made out of any suitable material, such as steel. Finally, movable contact plate 14 includes a pair of motion-limiting stops 86 which cooperate with rear surfaces of the stationary contact plate to limit pivotal displacement of the movable contact plate thereon in its biased position. In the presently preferred embodiment, the movable contact plate permits slight pivotal movement of each movable contact 38 to allow force to be evenly distributed. Moreover, grooves 44 permit the portions of the structure associated with each power phase to deflect independently, thereby further insuring independent and even application of contact forces in the structure. As the structure closes, as summarized below, increasing contact force at a small magnetic gap will generally cause the deflection of these components to allow for contact wear and tolerance variations.

Figure 3:
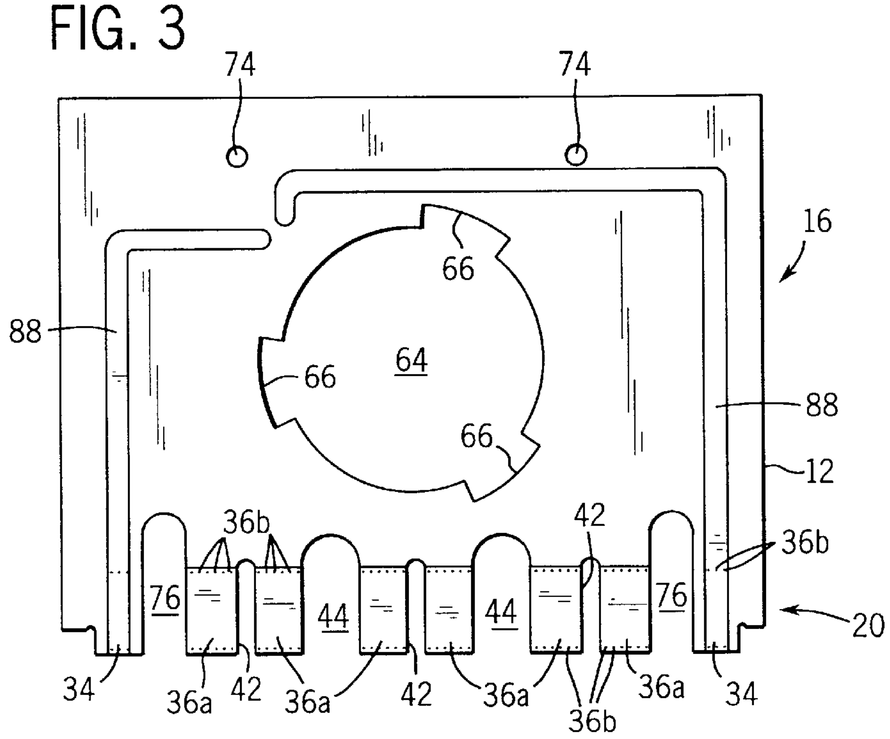
FIG. 3 is a first component board or plate of the assembly of FIG. 1 with an electromagnet assembly removed.

FIGS. 3–8 illustrate the foregoing sub-components in somewhat greater detail. As shown in FIG. 3, the prongs of the stationary contact plate 12 on which the stationary contacts are mounted are separated from one another by spaces or slots 42 between pairs of stationary contacts, and by somewhat larger spaces or slots 44 between the pairs of contacts associated with each power phase. Laterally, spaces 76 are provided for receiving the motion-limiting stops 86 of the movable contacts plate. FIG. 3 shows the stationary contact plate from a rear side, wherein traces 88 laid down on the surface of the plate can be viewed. These traces extend from the lower edge prongs to locations adjacent to aperture 64. When assembled with electromagnet assembly 46, leads from the electromagnet winding are soldered to ends of the traces adjacent to the aperture to permit actuation of the electromagnet by application of a potential difference to the leads 34. Also shown in FIG. 3 are rear conductive pads 36a which are formed on the rear side of each prong opposite a stationary contact. The pads may be formed by any suitable process, such as plating. Apertures 36*b*, also plated, extend between the rear pads and the stationary contacts to electrically couple the conductive structures to one another. When installed in a device, the conductive pads 36*a* may be electrically coupled to line and load conductors such as by soldering.

Figure 4:
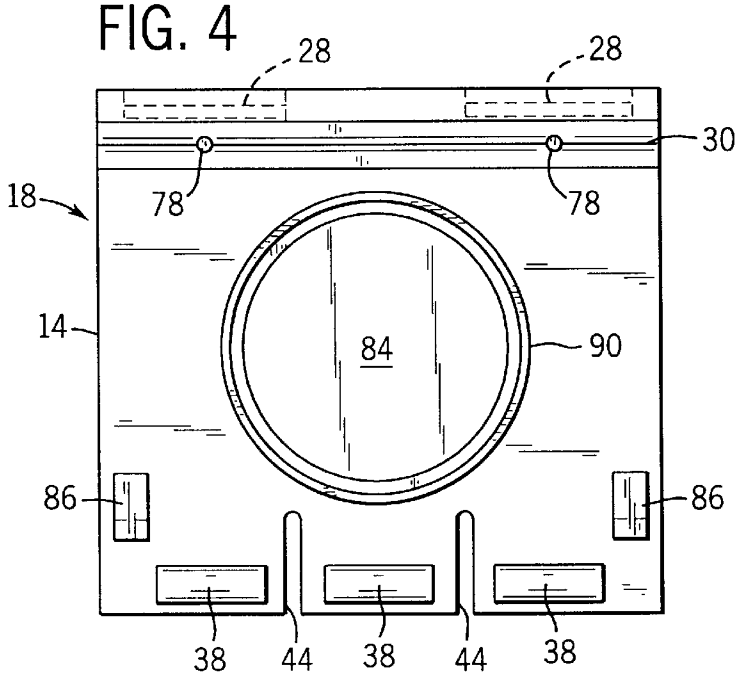
FIG. 4 is a front plan view of a second of the boards or plates of the assembly of FIG. 1 designed to carry an electromagnetic armature.
Figure 5:
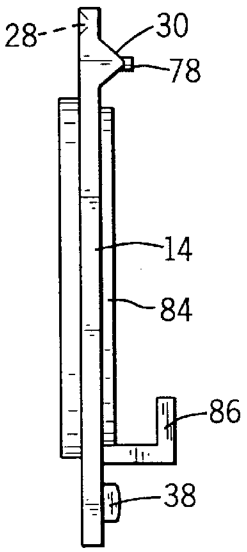
FIG. 5 is a side view of the board of FIG. 4.

FIGS. 4 and 5 illustrate the movable contact plate in front elevational and side views, respectively. As shown in FIG. 4, when completely assembled, armature 84 is lodged in a central position in the movable contact plate, and movable contacts 38 extend from prongs at the lower contact portion 22 thereof. A central aperture or recess 90 is formed in the movable contact plate for receiving a disk-like ferromagnetic armature 84. In a presently preferred embodiment armature 84 is snapped into place within this recess. Where desired, additional support or securement structures may be provided for preventing movement or removal of the armature. Also, in appropriate arrangements, armature 84 may be formed as a slug or panel imbedded within plate 14, such as a thickened copper slug within a conventional circuit board-type material.

Figure 6:
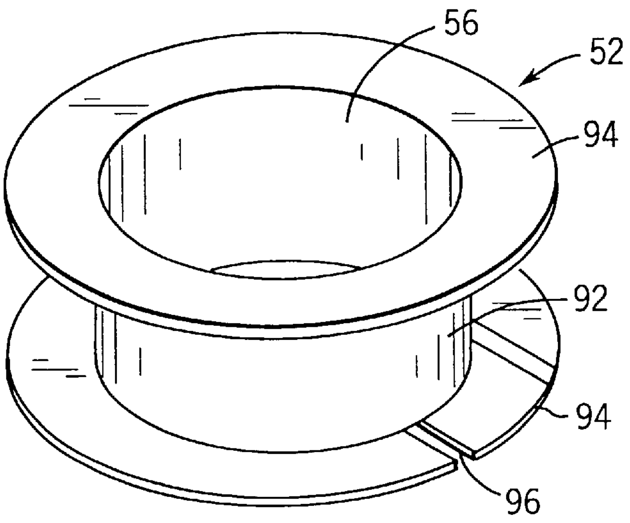
FIG. 6 is a perspective view of a bobbin for use in the electromagnet assembly shown in FIG. 2.
Figure 7:
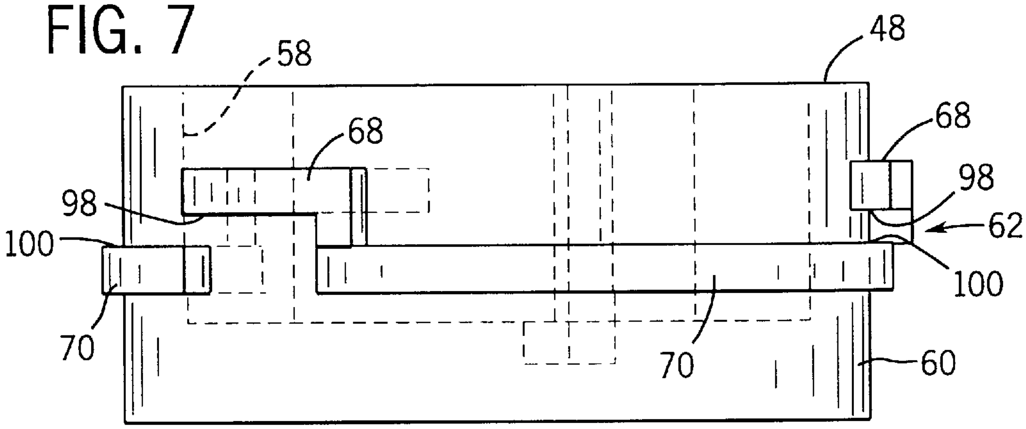
FIG. 7 is a side elevational view of a yoke for use in the electromagnet assembly.

FIG. 6 illustrates the bobbin used in the electromagnet assembly described above. As shown in FIG. 6, the bobbin features a central aperture 56 surrounded by a support tube 92. Lateral flanges 94 bound the support tube to house the winding which is provided directly on the support tube between the flanges. A lead slot 96 is provided in a lower flange to accommodate the winding leads which exit the bobbin and are soldered to traces 88 on the stationary contact plate (see FIG. 3).

The bobbin of FIG. 6 is designed to fit within yoke 48 of the electromagnet assembly 46. This yoke, shown in greater detail in FIG. 7, therefore features an internal annular recess 58 in which the bobbin is positioned. Ribs formed about the yoke facilitate insertion of the electromagnet assembly in the stationary contact plate and allow the assembly to be easily secured in place therein. In the illustrated embodiment, a front-fitting rib 68 is designed to pass through radial recesses 66 formed in the stationary contact plate (see, e.g. FIG. 3). Movement into the aperture 64 within the stationary contact plate is limited by a rear-fitting rib 70 which abuts the rear surface of the stationary contact plate upon full insertion. The electromagnet assembly may be twisted slightly after such full insertion to cause portions of the stationary contact plate to enter between the front and rear-fitting ribs. The electromagnet assembly is then held in place by rear-facing surfaces of the front ribs 68, and by front surfaces 100 of the rear ribs 70.

Figure 8:
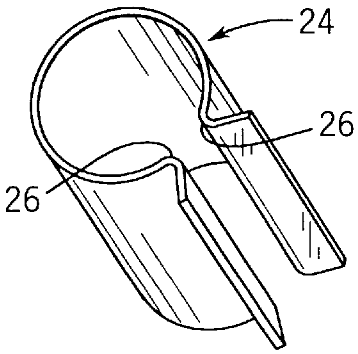
FIG. 8 is a perspective view of a return spring for use in the assembly.

FIG. 8 illustrates a presently preferred configuration for biasing springs used to urge the stationary and movable contact plates into a normally open position as shown in FIG. 1. As mentioned above, the biasing spring may be made of any suitable material, such as spring steel, and is conveniently formed with bearings 26 which contact the stationary and movable contact plates to pivot the movable contact plate into the open position.

Figure 9:
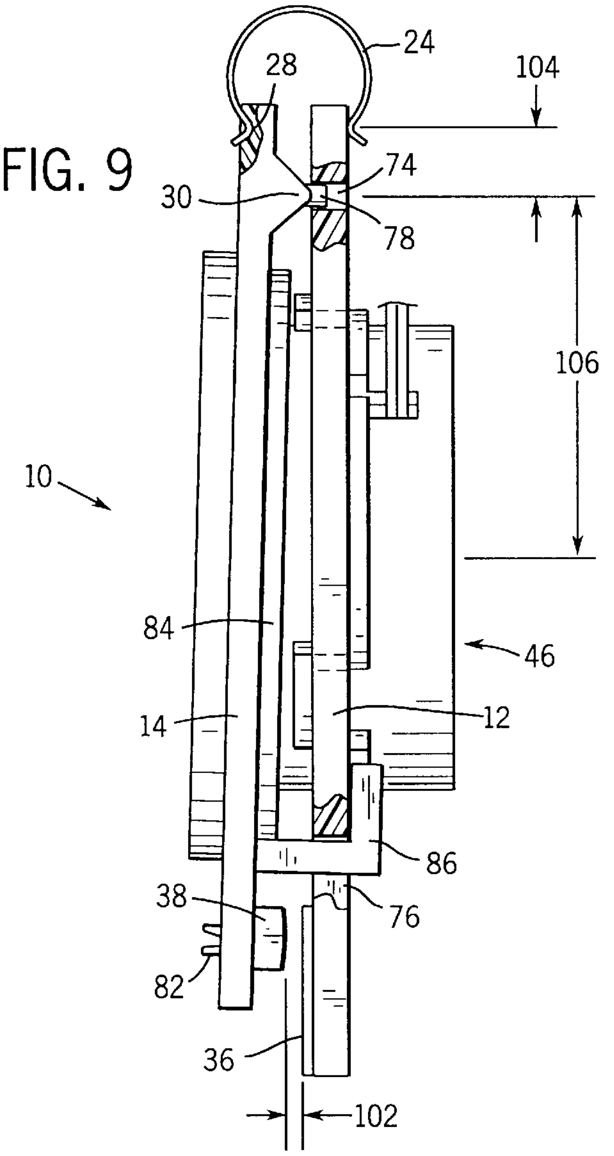
FIG. 9 is a side elevational view, with portions broken away, illustrating the position of the various sub-components and elements of the operator assembly in an open or biased position.

FIG. 9 shows the foregoing structures in their normal or biased position in the final assembly. As illustrated in FIG. 9, when assembled, the movable contact plate is pivotable on the stationary contact plate, with alignment pins 78 lodged loosely within alignment holes 74, and protrusion 30 bearing against a face of the stationary contact plate. In this orientation, armature 84 lies in mutually facing relation adjacent to electromagnet assembly 46. Motion-limiting stops 86 are positioned within slots 76, and contact a rear surface of the stationary contact plate due to the force exerted by springs 24. The length of the stops 86 is designed to provide desired open clearance 102 between the stationary and movable contacts 36 and 38.

It should be noted that the foregoing structure defines a first degree lever in which protrusion 30 forms a fulcrum and springs 24 exert a force which rocks the movable contacts plate on the stationary contact plate to its open position. Springs 24 are sized to provide sufficient force to open the assembly with sufficient rapidity to avoid unnecessary arcing and degradation of the movable and stationary contacts. Moreover, armature 84 and electromagnet assembly 46 are sized to provide sufficient force to close the assembly rapidly upon energization of the electromagnet. As will be appreciated by those skilled in the art, the size and configuration of these structures will depend upon the mass of the contact plates, the movable armature, as well as distances between the points of actuation of the spring and the center point of the fulcrum denoted 104 in FIG. 9, as well as between this fulcrum point and the center of the electromagnet assembly and armature, denoted 106 in FIG. 9.

Figure 10:
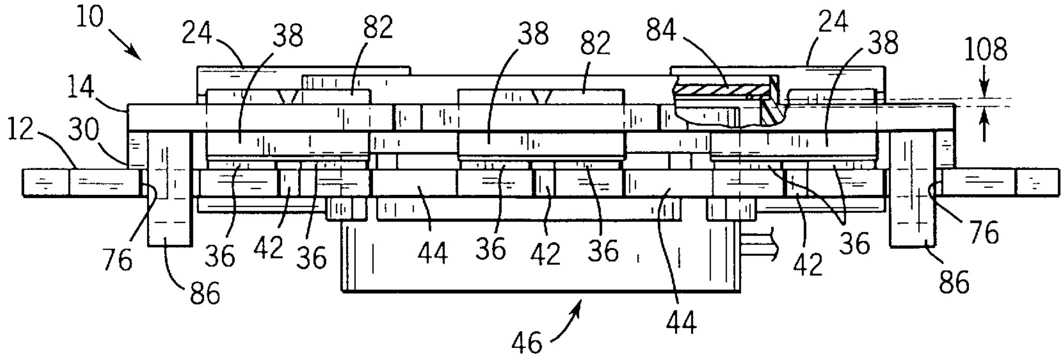
FIG. 10 is a bottom elevational view of the assembly of FIG. 9 in a closed position.

FIG. 10 illustrates the structure of FIG. 9 in its closed position from a bottom plan view. As noted above, upon energization of the electromagnet assembly, the movable contact plate is drawn towards the stationary contact plate opposing the force of the assembly springs. Movable contacts 38 are thus brought into engagement with stationary contacts 36 to complete the electrical path between the stationary contacts. Where pairs of stationary contacts are provided, as in the illustrated example, each movable contact serves as a conductive spanner establishing an electrical current carrying path through each pair of stationary contacts. In the presently preferred embodiment sufficient clearance is provided between the armature 84 and the electromagnet assembly 46 to prevent actual contact between these structures upon closing.

While the foregoing preferred embodiments have been described and illustrated by way of example, the present invention is not intended to be limited in any way to any particular embodiment or form of execution. Rather, the invention is intended to extend to the full scope of the appended claims as permitted by this specification and the prior art. Among the variations on the foregoing structures, for example, more or fewer than three sets of contacts may be provided on each plate, such as for single phase, single pole or other devices. Similarly, while the foregoing embodiment facilitates termination of line and load conductors on a single board (corresponding to the stationary contacts of each pair), the present technique may be adapted to devices in which mating contacts on one board serve as line side contacts and respective contacts on the other board serve as load side contacts.

What is claimed is:

1. An operator assembly for an electromagnetic switching device, the assembly comprising:

a first rigid insulative board comprising at least one first conductive member fixedly affixed to the first rigid insulative board;

a second rigid insulative board disposed in mutually facing relation with respect to the first board and comprising at least one second conductive member fixedly affixed to the second rigid insulative board;

a pivot assembly disposed adjacent to first edges of the first and second rigid insulative boards permitting pivotal movement between the first and second boards and biasing the boards towards a normal operating position; and an electromagnet set including an electromagnet assembly and an armature, the electromagnet set being secured to the first and second boards, the electromagnet assembly being energizable to cause movement of the armature and thereby to pivot the first and second boards from the normal operating position to an actuated position, wherein in the actuated position the at least one first conductive member and the at least one second conductive member are engaged.

2. The operator assembly of claim 1, wherein the pivot assembly includes a pivot member disposed between the first and second boards and a biasing member contacting the first and second boards to urge the boards towards the normal operating position.

3. The operator assembly of claim 1, wherein the electromagnet assembly is supported on the first board and the first board includes conductors for conveying energizing current to the electromagnet assembly.

4. The operator assembly of claim 3, wherein the armature is supported on the second board in mutually facing relation with respect to the electromagnet assembly.

5. The operator assembly of claim 1, wherein the first board supports a plurality of pair of first conductive elements and the second board supports a corresponding plurality of second conductive elements, and wherein each of the second conductive elements spans a respective pair of first conductive elements in the actuated position.

6. The operator assembly of claim 1, further comprising a stop member extending between the first and second boards for limiting pivotal movement of the boards in the normal operating position.

7. An operator for an electromechanical switching device, the operator comprising:

a first rigid insulative plate having a first pivot edge and a first contact edge opposite the first pivot edge, the first contact edge comprising a first electrical contact and a second electrical contact;

a second rigid insulative plate having a second pivot edge and a second contact edge, the second contact edge comprising a third electrical contact, the second plate being disposed in facing relation with respect to the first plate;

a plate coupling assembly disposed adjacent to the first and second pivot edges of the first and second rigid insulative plates, the plate coupling assembly operating to secure the first and second rigid insulative plates and to enable relative pivotal motion of the first and second rigid insulative plates, the plate coupling assembly providing a biasing force to pivotally separate the first rigid insulative plate from the second rigid insulative plate, an electromagnet secured to one of the first and second rigid insulative plates; and an armature secured to the other one of the first and second rigid insulative plates that is not secured to the electromagnet;

wherein energization of the electromagnet produces a magnetic force that overcomes the biasing force and attracts the armature towards the electromagnet, wherein the third electrical contact is brought into contact with both the first and second electrical contacts to electrically couple the first and second electrical contacts.

8. The operator of claim 7, wherein the first rigid insulative plate comprises a plurality of pairs of first and second electrical contacts, each pair corresponding to an electrical phase, further wherein the second rigid member comprises a plurality of third electrical contacts, each third electrical contact being operable to electrical couple the first and second electrical contacts corresponding to one electrical phase.

9. The operator of claim 7, wherein the first electrical contact is disposed on a first prong and the second electrical contacts is disposed on a second prong, a first gap separating the first and second prongs, wherein upon energization of the electromagnet assembly the third electrical contact bridges the first gap to electrically couple the first and second electrical contacts.

10. The operator of claim 7, wherein the pivoting and biasing assembly comprise at least one C-shaped spring extending between the first and second rigid insulative plates adjacent to the first and second pivot edges.

11. The operator of claim 10, further comprising a pivot member disposed on one of the first and second rigid insulative plates.

12. The operator of claim 11, wherein the pivot member comprises a projection and the other one of the first and second rigid insulative plates comprises a recess, wherein the recess is configured to receive the projection to prevent lateral displacement of the first and second rigid insulative plates.

13. The operator of claim 7, further comprising a motion-limiting stop disposed on one of the first and second rigid insulative plates, the motion-limiting stop cooperating with the other one of the first and second rigid insulative plates to limit pivotal displacement of the first and second rigid insulative plates.

14. The operator of claim 7, wherein the first rigid insulative plate includes conductive traces for conducting energizing current to the operator assembly.

15. An operator assembly for a switching device, the assembly comprising:

a first plate made of a rigid insulative material having a first pivot end and supporting at least one stationary contact at a first contact end opposite the first pivot end;

a second plate made of a rigid insulative material having a second pivot end, the second plate being pivotally disposed in facing relation with respect to the first plate and supporting at least one movable contact at a second contact end opposite the second pivot end;

a biasing member disposed adjacent to the first and second ends for urging the first and second plates pivotally towards a biased position;

a pivot member secured to the first or second plate adjacent to the first and second pivot ends for allowing relative pivotal movement of the plates during operation;

an armature supported on one of the first and second plates; and an electromagnet assembly secured to the other one of the first and second plates for producing a force to overcome the biasing member and attract the armature towards the electromagnet assembly to draw the second plate towards the first plate and thereby to place the at least one movable contact into engagement with the at least one stationary contact, wherein the electromagnet assembly comprises a coil of wire secured to a securing member, wherein the securing member and the other one of the first and second plates are configured for toolless mating engagement.

16. The operator of claim 15, wherein the coil is wound on a bobbin and the bobbin is secured to the securing member.

17. The operator of claim 16, wherein the securing member comprises a hollow cylindrical body configured to house the bobbin and coil.

18. The operator of claim 15, wherein the securing member has a first portion and the one of the first and second plates has a second portion, further wherein the securing member is secured to the one of the first and second plates by rotating the securing member relative to the one of the first and second plates to matingly engage the first and second portions.

19. The operator of claim 18, wherein the securing member is disposed through an opening in the one of the first and second plates, further wherein the securing member comprises a projection to limit displacement of the securing member through the opening.

20. The operator assembly of claim 15, wherein the one of the first and second plates comprises conductive traces for supplying electrical power to the electromagnet assembly.

21. The operator assembly of claim 15, wherein the pivot member includes a protrusion extending towards the first plate.

22. The operator assembly of claim 21, wherein the protrusion includes an elongated ridge extending generally parallel to an edge of the first and second plates.

23. The operator assembly of claim 15, wherein the at least one stationary contact includes a pair of stationary contacts, and wherein the at least one movable contact includes a conductive spanner which engages each stationary contact of the pair of stationary contacts upon closure.

24. The operator assembly of claim 15, including three pairs of stationary contacts supported on the first plate, and three respective movable contacts supported on the second plate.

25. The operator assembly of claim 15, further comprising an abutment member extending between the first and second plates for limiting pivotal movement of the second plate with respect to the first plate upon opening.

* * * * *